United States Patent [19]
Huang

[11] Patent Number: 5,803,828
[45] Date of Patent: Sep. 8, 1998

[54] SLIP-ON GOLF CLUB GRIP

[76] Inventor: Ben Huang, 19472 Woodlands La., Huntington Beach, Calif. 92648

[21] Appl. No.: 682,929

[22] Filed: Jul. 16, 1996

Related U.S. Application Data

[63] Continuation-in-part of Ser. No. 637,931, Jan. 14, 1991, abandoned, Ser. No. 890,383, May 26, 1992, abandoned, Ser. No. 953,190, Sep. 29, 1992, abandoned, Ser. No. 58,313, May 3, 1993, Ser. No. 278,186, Jul. 21, 1994, Pat. No. 5,397,123, Ser. No. 542,009, Nov. 13, 1995, Pat. No. 5,645,501, Ser. No. 567,339, Dec. 28, 1995, abandoned, Ser. No. 595,445, Feb. 26, 1996, and Ser. No. 656,942, Jun. 14, 1996.

[51] Int. Cl.$^6$ ................................................. A63B 49/08
[52] U.S. Cl. ......................... 473/300; 473/549; 473/301
[58] Field of Search .................................... 473/300, 301, 473/302, 549, 550, 551, 568

[56] References Cited

U.S. PATENT DOCUMENTS

| | | | |
|---|---|---|---|
| 1,139,843 | 5/1915 | Brown . | |
| 1,447,989 | 3/1923 | Kinsman . | |
| 1,556,781 | 10/1925 | Gjorup . | |
| 1,701,856 | 2/1929 | Kraeuter . | |
| 1,940,104 | 12/1933 | Russell et al. ............................ | 273/81 |
| 1,943,399 | 1/1934 | Smith ....................................... | 273/81 |
| 2,003,917 | 6/1935 | Bowden ................................... | 273/75 |
| 2,046,164 | 6/1936 | Herkner ................................... | 273/81 |
| 2,086,062 | 7/1937 | Bray ......................................... | 273/81 |
| 2,166,044 | 7/1939 | Fletcher ................................... | 273/75 |
| 2,166,045 | 7/1939 | Fletcher ................................... | 273/75 |
| 2,513,655 | 7/1950 | Lamkin et al. .......................... | 273/81 |
| 2,659,605 | 11/1953 | Le Tourneau . | |
| 2,737,503 | 3/1956 | Sprague et al. . | |
| 3,582,456 | 6/1971 | Stolki ...................................... | 161/165 |
| 3,654,066 | 4/1972 | Fukushima et al. ................... | 161/160 |
| 3,845,954 | 11/1974 | Case ........................................ | 273/75 |
| 3,848,480 | 11/1974 | Oseroff et al. ........................ | 74/558.5 |
| 3,848,871 | 11/1974 | Sweet et al. ............................ | 273/75 |
| 3,860,469 | 1/1975 | Gregorian et al. ..................... | 156/83 |
| 3,881,521 | 5/1975 | Johansen et al. ....................... | 138/126 |
| 3,899,172 | 8/1975 | Vaughn et al. .......................... | 273/73 |
| 4,015,851 | 4/1977 | Pennell .................................... | 273/75 |
| 4,044,625 | 8/1977 | D'Haem ................................ | 74/558.5 |
| 4,070,020 | 1/1978 | Dano ....................................... | 273/73 |
| 4,100,006 | 7/1978 | Buckley .................................. | 156/78 |
| 4,133,529 | 1/1979 | Gambino . | |
| 4,159,115 | 6/1979 | Ticktin et al. . | |
| 4,174,109 | 11/1979 | Gaiser ..................................... | 273/81.6 |
| 4,284,275 | 8/1981 | Fletcher .................................. | 273/75 |
| 4,347,280 | 8/1982 | Lau et al. ............................. | 428/304.4 |
| 4,454,187 | 6/1984 | Flowers et al. ........................ | 428/159 |
| 4,567,091 | 1/1986 | Spector .................................. | 428/222 |
| 4,647,326 | 3/1987 | Pott ......................................... | 156/77 |
| 4,660,832 | 4/1987 | Shomo .................................... | 273/73 |
| 4,662,415 | 5/1987 | Proutt ...................................... | 150/52 |
| 4,736,949 | 4/1988 | Muroi ...................................... | 273/73 |
| 4,765,856 | 8/1988 | Doubt ..................................... | 156/212 |
| 4,853,054 | 8/1989 | Turner et al. ........................... | 156/78 |
| 4,934,024 | 6/1990 | Sexton, I ................................ | 16/111 |
| 5,042,804 | 8/1991 | Uke ......................................... | 273/75 |
| 5,110,653 | 5/1992 | Landi ...................................... | 428/116 |
| 5,274,846 | 1/1994 | Kolsky . | |
| 5,275,407 | 1/1994 | Soong ..................................... | 273/73 |

FOREIGN PATENT DOCUMENTS

| | | |
|---|---|---|
| 2398099 | 7/1977 | France . |
| 2805314 | 8/1979 | Germany . |
| 3414978 | 10/1985 | Germany . |
| 458367 | 6/1935 | United Kingdom . |
| 443228 | 2/1936 | United Kingdom . |
| 870021 | 6/1961 | United Kingdom . |
| 979242 | 1/1965 | United Kingdom . |

*Primary Examiner*—William M. Pierce
*Attorney, Agent, or Firm*—Fulwider Patton Lee & Utecht, LLP

[57] ABSTRACT

A slip-on grip for a golf club shaft defined by a resilient, cushioned polyurethane and felt strip that is spirally wrapped about a resilient sleeve which is then adhered to the shaft of the golf club. The grip may be substituted for the original grip or, alternatively, may be installed as the original grip on a new golf club shaft.

10 Claims, 3 Drawing Sheets

SLIP-ON GOLF CLUB GRIP

This is a continuation-in-part of application(s) Ser. No. 07/637,931 filed on Jan. 14, 1991 (now abandoned) Ser. No. 07/890,383 filed on May 26, 1992 (now abandoned) Ser. No. 07/953,190 filed on Sep. 29, 1992 (now abandoned) Ser. No. 08/058,313 filed on May 3, 1993 pending Ser. No. 08/278,186 filed on Jul. 21, 1994 (U.S. Pat. No. 5,397,123) Ser. No. 08/542,009 filed on Nov. 13, 1995 (U.S. Pat. No. 5,645,501) Ser. No. 08/567,339 filed on Dec. 28, 1995 (now abandoned) Ser. No. 08/595,445 filed on Feb. 26, 1996 pending and Ser. No. 08/656,942 filed on Jun. 14, 1996 pending.

BACKGROUND OF THE INVENTION

1. Field of the Invention

The present invention relates to an improved golf club grip which may be applied to a golf club shaft by a golf club manufacturer as original equipment, or alternatively, be applied as a replacement for an original grip.

2. Description of the Prior Art

It is well known that shock generated by impact between a golf club and a golf ball can adversely affect muscle tissue and arm joints such as elbow joints. The energy generated by such shock is usually of high frequency and short duration with rapid decay, and which is often known as "impact shock." Tight grasping of a grip to keep it from slipping contributes to the shock to the muscle tissue and arm joints of the users golf clubs. Prior art golf club shaft grips have generally been made of leather and later of rubber made to look like leather, and are molded from a single piece of rubber or synthetic plastic and do not provide adequate shock absorbing qualities. Another major disadvantage of such conventional golf club grips is their tendency to become slippery when dampened, as for example, when playing under rainy conditions or by contact with perspiration formed on the golfer's hands. Slippery contact of a golfer's hands with a golf club grip reduces his feel of the golf club. Such conventional golf clubs are additionally comparatively heavy.

SUMMARY OF THE INVENTION

I have developed an improved slip-on golf club grip designed to solve the problems inherent to conventional golf club grips. The golf club grip of the present invention is readily compressible when gripped by a golfer thereby increasing his touch over the golf club, absorbs more vibration and shock, and also reduces fatigue. The golf club grip of the present invention also strengthens the golfer's grip on a golf club by providing increased tackiness between his hands and the golf club grip. Additionally, the golf club grip of my invention enhances the player's feel and touch during play, thereby eliminating the need to wear a glove which is needed to protect against abrasion of a golfer's hand when using a conventional golf club grip. My grip also stays tacky but not sticky when wet. The grip of the present invention is lighter in weight than conventional rubber grips, so that more of the total golf club weight is distributed to the golf club head thereby increasing club head speed and golf ball travel.

The golf club grip of the present invention includes an elongated strip formed of a polyurethane material bonded over a felt layer. Preferably, the pores of the polyurethane layer will extend vertically relative to the longitudinal axis of the strip. The ratio of the thickness of the polyurethane layer to the felt layer should preferably be a minimum of approximately 0.18. The preferred form of golf club grip embodying the present invention also utilizes a resilient sleeve about which is spirally wrapped the elongated resilient strip. The felt layer provides strength to the polyurethane layer. The polyurethane layer is of closed pore construction which provides a cushioned grip and enhanced tackiness to the golfer's hand. The assembled sleeve and strip are slipped over the grip-receiving upper portion of a golf club shaft and adhered thereto in a conventional manner.

The grip of my invention also utilizes sidewardly, recessed, compressed reinforcement traction side edges along its length. Such side reinforcement edges inhibit unraveling of the grip from the racquet or golf club handle, enhances the frictional grip of the user and provides an improved appearance over existing grips. The traction side edges also reduce interference with other golf club grips as a club is withdrawn from a golfer's bag. The grip of my invention may either be used as a replacement grip, or, alteratively be fabricated as original equipment by a manufacturer of golf clubs.

BRIEF DESCRIPTION OF THE DRAWINGS

These and other features of the present invention will become apparent from the following detailed description, when taken in conjunction with the accompanying drawing.

DETAILED DESCRIPTION OF PREFERRED EMBODIMENTS

Figure 1:
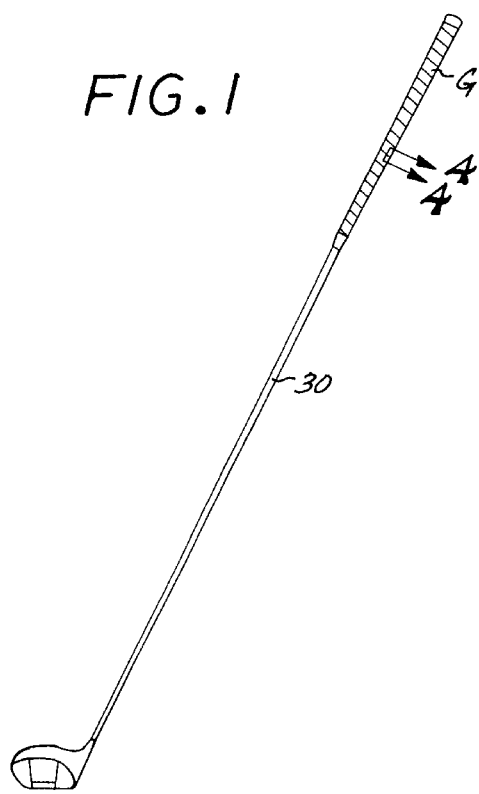
FIG. 1 is a perspective view in reduced scale showing a golf club provided with a grip embodying the present invention.
Figure 2:
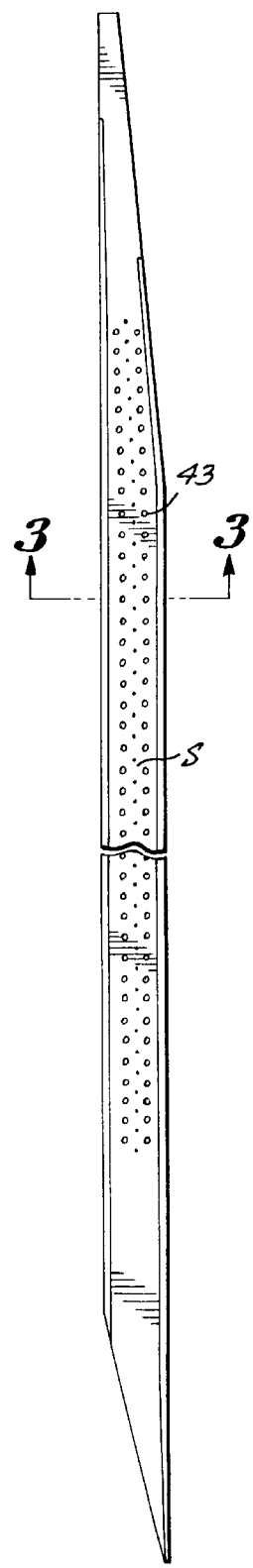
FIG. 2 is a top plan view of the strip member of such golf club grip.
Figure 3:
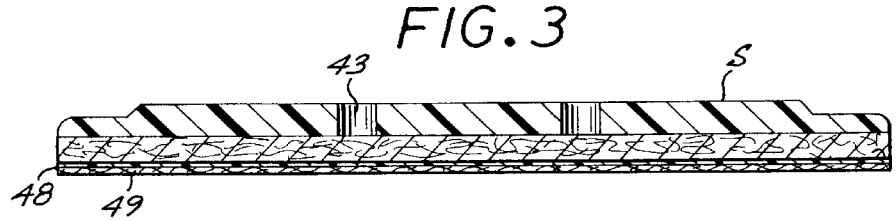
FIG. 3 is a vertical sectional view taken in enlarged scale along lines 3—3 of FIG. 2.
Figure 4:
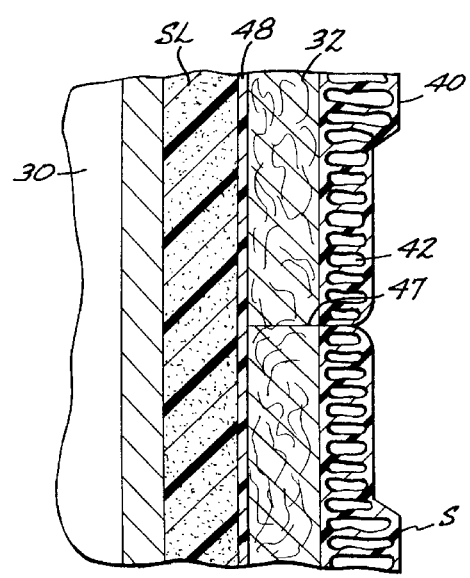
FIG. 4 is a further enlarged vertical sectional view taken along lines 4—4 of FIG. 1.
Figure 5:
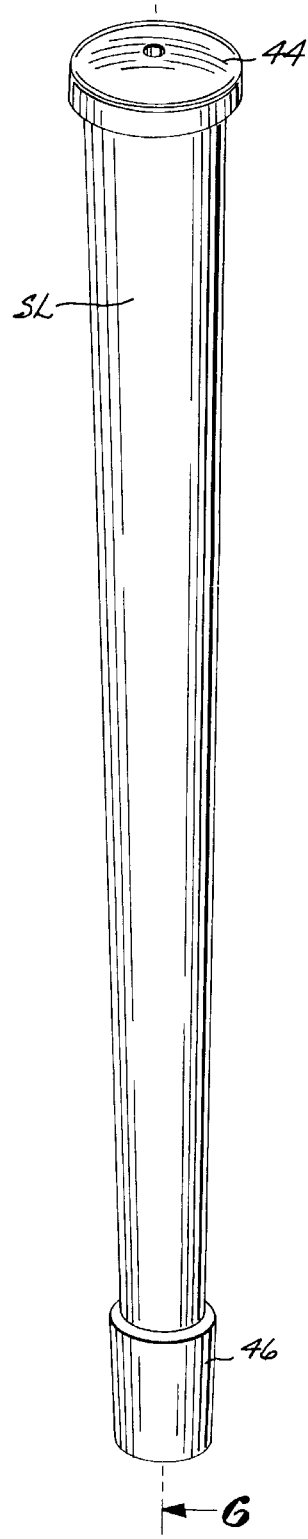
FIG. 5 is a perspective view showing the sleeve member of such grip.
Figure 6:
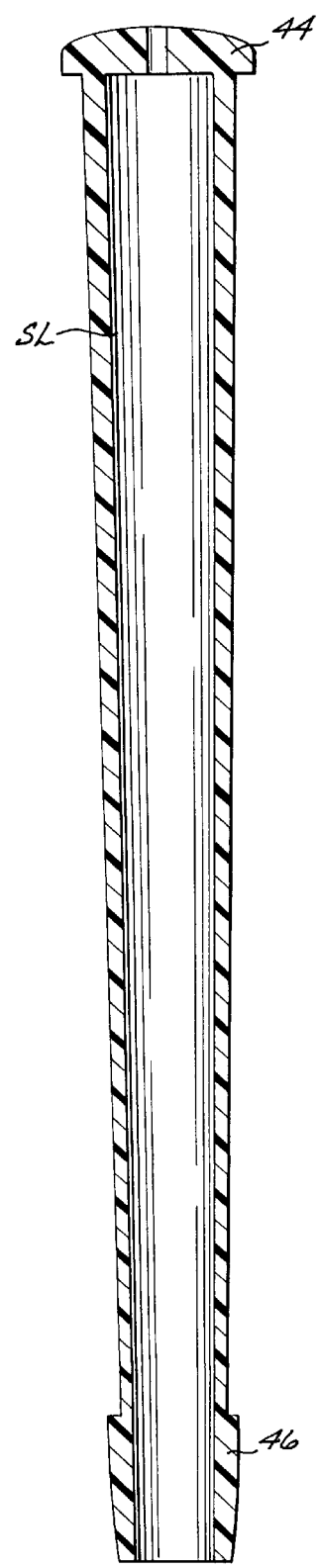
FIG. 6 is a vertical sectional view taken along lines 6—6 of FIG. 5.

Referring to the drawings, an elongated resilient strip S utilized to provide a preferred form of slip-on golf club grip of the present invention is shown particular in FIGS. 2–4. Such strip S is adapted to be spirally wrapped about a resilient sleeve SL after which the slip-on grip is adhered to the upper portion of the shaft 30 of a conventional golf club to provide an improved slip-on golf club grip G as shown in FIG. 1.

More particularly, as shown in FIGS. 2–4, grip G includes an open-pored felt layer, generally designated 32, having an inner or bottom surface which is spirally wrapped about a resilient sleeve SL. Grip G is telescopically slipped over the upper portion of golf club shaft 30, as indicated in FIG. 1.

As shown particularly in FIGS. 3 and 4, a smooth closed pore polyurethane layer, generally designated, 40 is bonded to the upper surface of the felt layer 32. The bonded-together polyurethane and felt layers are seen to be configured as unitary strip S shown in plan view in FIG. 2.

The polyurethane layer 40 provides a cushioned grip of the player's hand on a golf club shaft and also enhances a player's grasp of the golf club by providing increased tackiness between the player's hand and the grip. The felt layer 32 provides strength to the polyurethane layer and serves as a means for attaching the bonded-together polyurethane and felt strip to sleeve SL. The polyurethane layer may be formed with vertically extending perforations 43 shown in enlarged scale in FIG. 3, which enhance the absorption rate of perspiration from a user's hand, increases the cushioning effect of the grip by providing a controlled restriction of air escaping from within the pores of the felt layer when the grip is grasped by a golfer, and increases frictional contact between the grip G and a golfer's hands.

The felt layer 32 of the strip is formed of a suitable open-pored material and has its upper or outer surface bonded to the lower surface of the polyurethane layer 40. As indicated in FIG. 4, the pores 42 of polyurethane layer 40 extend vertically, i.e. generally normal to the longitudinal axis of the strip SL and golf club shaft 30 when the grip has been affixed to such shaft. The polyurethane layer 40 may be formed in a conventional manner by coating one side of a felt strip with a solution of polyurethane (e.g. polyester or polyether) dissolved in a dimethyl formamide (DMF), immersing the coated strip in water baths to displace the DMF and cause the urethanes to coagulate, and finally driving off the water by the application of pressure and heat. In this manner, the pores 42 will extend perpendicularly relative to the longitudinal axis of the strip, while the underside of the polyurethane layer is bonded to the upper surface of the felt strip. Applicant has discovered that greatly improved shock absorbing qualities may be obtained in a golf club grip where the ratio of the thickness of the polyurethane layer to the thickness of the felt layer is minimum of approximately 0.18 in order that pores 42 may be formed. Excellent results have been obtained with this ratio, since the pores 42 permit the polyurethane layer to be readily compressed by the gripping force of a golfer's hands when making a swing.

Figure 7:
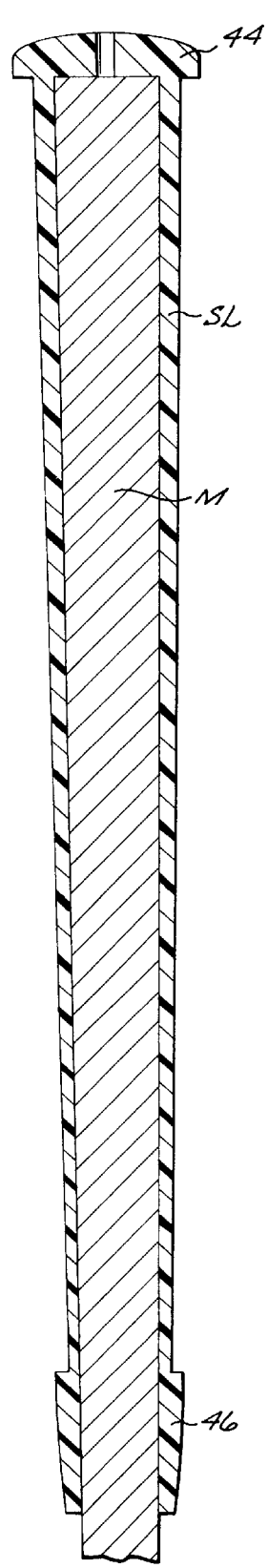
FIG. 7 is a view similar to FIG. 6 showing the sleeve of FIG. 6 supported by an expandable mandrel.
Figure 8:
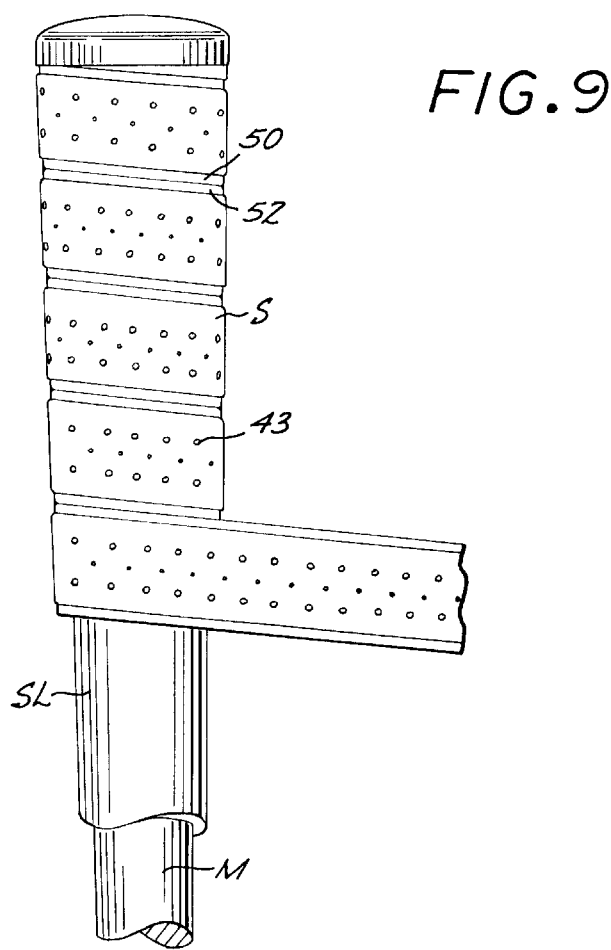
FIG. 8 is a broken side elevational view showing the strip member being spirally wrapped about the sleeve member on a collapsible mandrel.
Figure 9:
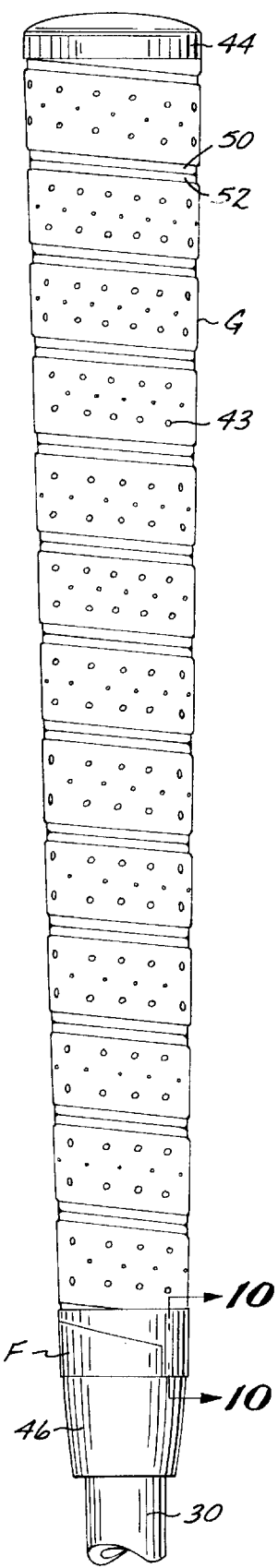
FIG. 9 is a side elevational view showing a completed grip embodying the present invention applied to a golf club shaft.
Figure 10:
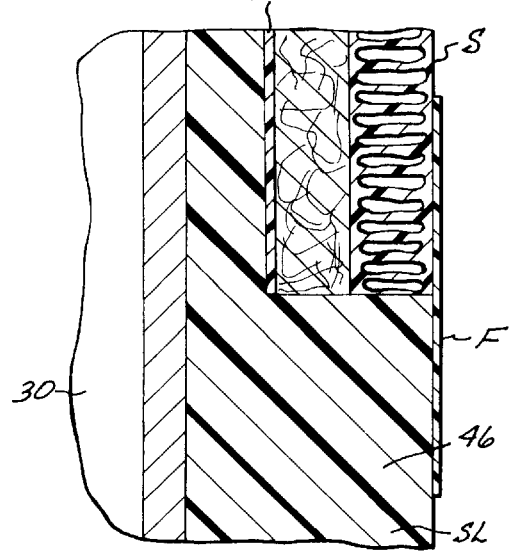
FIG. 10 is a broken vertical sectional view taken in enlarged scale along lines 10—10 of FIG. 9.

Sleeve SL is of synthetic plastic foam or rubber construction utilizing an integral cap 44. The lower portion of sleeve SL is formed with an enlarged diameter guide cylinder 46. Referring to FIG. 7, before the strip S is spirally wrapped about the sleeve SL, the sleeve is slipped over a conventional collapsible mandrel M with the underside of cap 44 abutting the top of the mandrel M. The strip is spirally wrapped about the sleeve SL, as indicated in FIG. 8, with the side edges of the strip S disposed in tight abutment as indicated at 47. The underside of the felt layer is adhered to sleeve SL by a layer of adhesive 48 originally covered by a removable protective tape 49 (FIG. 3). When the complete length of the strip S has been spirally wrapped about the sleeve SL it will extend from the underside of the cap 44 to the top of the guide cylinder 46. Note that the strip S may be wrapped about sleeve SL without utilizing a mandrel. Finishing tape F or the like may be wrapped around a lower portion of the strip S and the guide cylinder 46 to prevent unraveling of the strip relative to the sleeve.

Referring to FIGS. 2, 4, and 8, the strip is preferably formed with inwardly extending reinforcement traction side edges 50 and 52. The traction side edges may be formed by means of a heated platen (not shown) which compresses the outer portions of the side edges of the polyurethane layer 40 below the original exterior surface dimension of the strip. Such compression increases the strength of the polyurethane layer in the vicinity of the traction side edges 50 and 52, and restrains unraveling of the strip S from the sleeve SL. The traction side edges 50 and 52 also enhances the golfer's grasp of the grip, and reduces interference with other golf clubs as a club is withdrawn from a golf bag.

After the completed grip G has been removed from the collapsible mandrel M, it will be slipped over the upper edge of golf club shaft 30 and adhered thereto by means of a conventional solvent. It is important that the grip G is rotated in a direction which tends to wrap the strip S against sleeve SL when the grip is applied to the golf club shaft 30 so as to eliminate any gaps between the side edges of the strip. The guide cylinder 46 stiffens the lower portion of the grip as it is slipped onto the golf club shaft 30. The sleeve SL will have a tight fit with golf club shaft 30 so that adhesive 48 will be pressed against the sleeve forming a secure bond between the underside of the strip and the exterior of the sleeve. This bond will increase as the grip is used and the tighter a golfer grasps the grip, the tighter the bond.

The aforedescribed golf club grip G embodying the present invention may be utilized as original equipment by a golf club maker, or alternatively, may be utilized as a replacement for an original golf club grip. Golf club grips embodying the present invention, provide a firm grasp of the club by the golfer even when the grip is dampened, as for example, when playing under rainy conditions or by contact with perspiration formed on the golfer's hands. Moisture accumulating on the grip will flow through perforations 43 to be absorbed by the felt layer 32 for subsequent evaporation. The present invention can absorb more vibration and shock than conventional grips and thereby reduces hand fatigue. Accordingly, a golfer can maintain a better hold on the grip than with conventional grips and can thereby maintain better control of his golf swing. Such control is enhanced by the tackiness inherent to the polyurethane layer of the grip. Also, golf club grips embodying the present invention enhance the golfer's feel and control during a swing and eliminates the need to wear a golf glove. Since the grip made in accordance with the present invention is lighter in weight than a conventional molded rubber or synthetic plastic grip, more of the total weight of the golf club is distributed to the club head thereby increasing club head speed and the distance of golf ball travel.

Various modifications and changes may be made with respect to the foregoing detailed description without departing from the spirit of the present invention.

What is claimed is:

1. A slip-on golf club grip that is positioned on and adhered to the upper portion of a golf club shaft, said grip comprising:

a resilient sleeve; and an elongated resilient strip that is spirally wrapped about the outer surface of the sleeve, with the side edges of the strip being in tight abutment, said strip including an open-pored felt layer having an inner surface adhered to and abutting the sleeve and a smooth closed-pore polyurethane layer having its inner surface bonded to the outer surface of the textile layer remote from the sleeve, with the pores of such polyurethane layer extending generally normal to the longitudinal axis of the sleeve.

2. The slip-on golf club grip according to claim 1, wherein the ratio of the thickness of the polyurethane layer to the felt layer being a minimum of about 0.18.

3. The slip-on golf club grip according to claim 1, wherein the polyurethane layer is formed with recessed compressed traction side edges.

4. The slip-on golf club grip according to claim 1, wherein the polyurethane layer is formed with air passages to channel moisture into the felt layer for evaporation.

5. The slip-on golf club grip according to claim 1, wherein the sleeve is formed with a cap at its upper portion and a guide cylinder at its lower portion, and the spirally wrapped strip extends between the bottom of the cap and the top of the guide cylinder.

6. The slip-on golf club grip according to claim 2, wherein the polyurethane layer is formed with air passages to channel moisture into the felt layer for evaporation.

7. The slip-on golf club grip according to claim 2, wherein the polyurethane layer is formed with recessed compressed traction side edges.

8. The slip-on golf club grip according to claim 2, wherein the sleeve is formed with a cap at its upper portion and a guide cylinder at its lower portion, and the spirally wrapped strip extends between the bottom of the cap and the top of the guide cylinder.

9. The slip-on golf club grip according to claim 3, wherein the polyurethane layer is formed with air passages to channel moisture into the felt layer for evaporation.

10. The slip-on golf club grip according to claim 7, wherein the sleeve is formed with a cap at its upper portion and a guide cylinder at its lower portion, and the spirally wrapped strip extends between the bottom of the cap and the top of the guide cylinder.

\* \* \* \* \*